(No Model.)
M. WARREN.
DETACHABLE PRESSURE GAGE.
No. 402,703. Patented May 7, 1889.
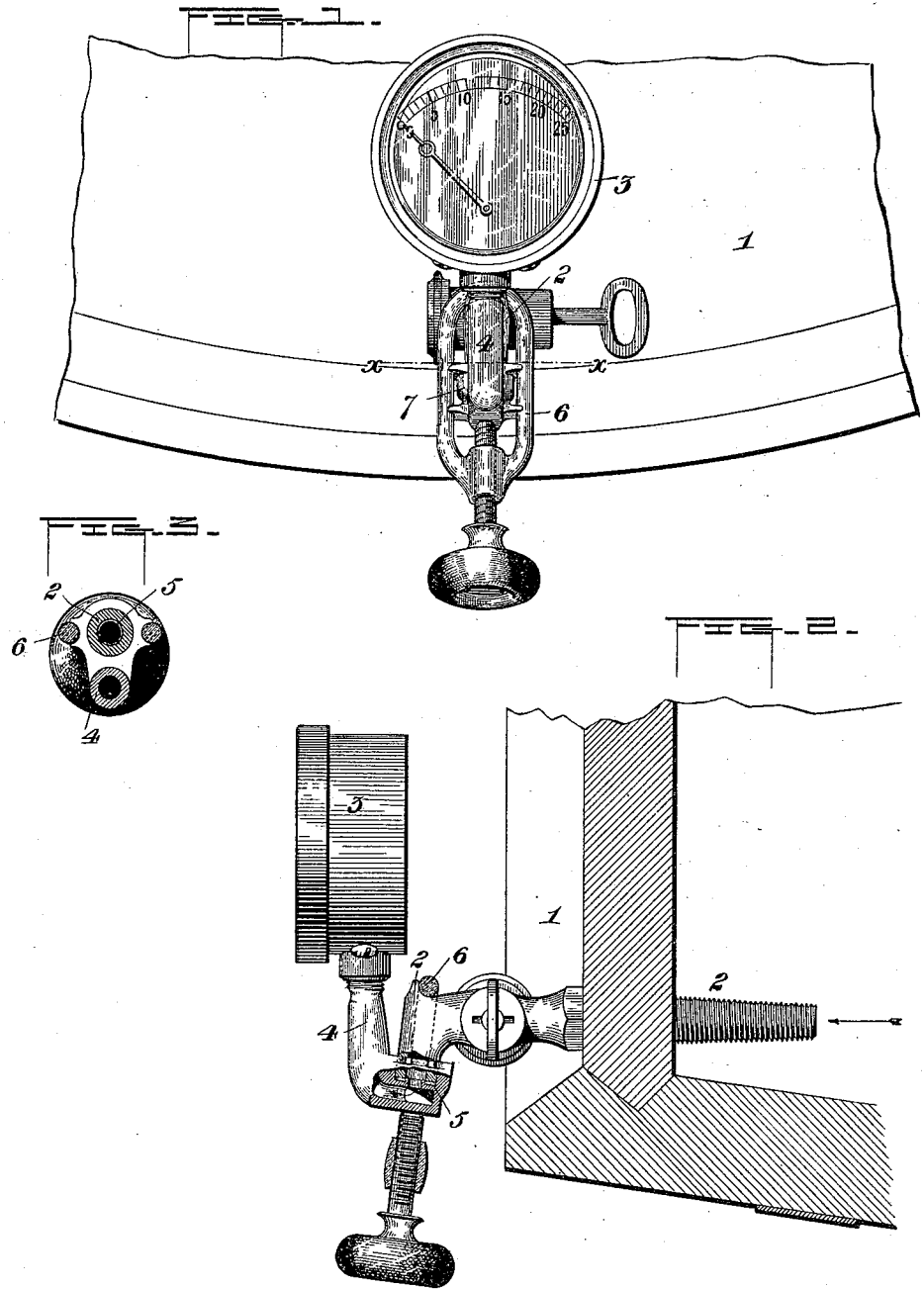
Witnesses,
L. A. Conner Jr.
F. Davis.
Inventor,
Marion Warren
by
Benj. R. Catlin, Attorney

UNITED STATES PATENT OFFICE.

MARION WARREN, OF ROCHESTER, NEW YORK.

DETACHABLE PRESSURE-GAGE.

SPECIFICATION forming part of Letters Patent No. 402,703, dated May 7, 1889.

Application filed October 12, 1888. Serial No. 287,915. (No model.)

*To all whom it may concern:*

Be it known that I, MARION WARREN, a citizen of the United States, residing at Rochester, in the county of Monroe and State of New York, have invented certain new and useful Improvements in Detachable Pressure-Gages; and I do hereby declare the following to be a full, clear, and exact description of the invention, such as will enable others skilled in the art to which it appertains to make and use the same.

The object of the invention is to provide means for indicating the interior pressure of various vessels or receptacles holding fluids under pressure, which means shall be detachable and portable, so as to be applicable to any number of vessels, casks, &c.

It consists in the matters hereinafter described and particularly pointed out.

In the accompanying drawings, Figure 1 is a front elevation; Fig. 2, a side elevation, partly in section; and Fig. 3 is a detail in section on the line $x$ $x$, Fig. 1.

The figure of reference 1 indicates a section of a cask, and 2 a faucet connected therewith.

3 is a pressure-gage of any suitable known construction, having an extension or conduit, 4, provided with a socket or seat, 5, to receive the mouth of the faucet. This socket is perforated, and the interior of the gage, conduit, faucet, and cask are in communication whenever the faucet-cock is suitably turned. This cock may, if desired, be provided with a well-known locking device. The socket or seat of the gage-pipe 4 is held in close contact with the mouth of the faucet by a link, 6. On the exterior of the pipe 4, or of the socket at its outer end, are formed projections or fingers arranged to embrace each side of the link and to be guided thereby. Through the bottom of the link a screw-threaded opening is made to receive a screw which bears on the under side of the socket, and by which the latter can be forced into close contact with the faucet, the opposite end of the link being held in any suitable manner, as by embracing the same behind the projection 7.

When it is desired to ascertain the amount of pressure on the interior of the cask or vessel, the gage is applied to the closed faucet, in the manner described, and the cock opened, whereupon pressure is transmitted from the cask to the gage and is there indicated.

This device is adapted to indicate hydrostatic pressure, in which case, of course, it should be applied at the base of the hydrostatic column to be measured. It is also adapted to indicate gas-pressure, and for this purpose may be applied to a faucet or pipe connecting with any part of the gas-containing vessel.

It is obvious that the details of construction may be varied without departing from the invention. The gage may be held upon or secured to the cock by links, clamps, or other known equivalents, it being only important that the fastening device shall admit of easy application, so that the gage can be rapidly used to test the pressure in a series of casks. The link and screw described might be reversed in position, so that the screw should bear upon the upper side of the faucet and draw the link and socket upward. The conduit 4 may be variously bent to conveniently present the socket to the mouth of a pipe-faucet or other conduit, and the socket itself may be varied in size and shape as desired; nor is it necessary, when a link is used in the clamping device employed, that said link be in contact with or directly supported by the faucet or pipe, as a separate support may be provided, which can be either connected directly to the faucet or pipe or be independently held by a bracket or post supported from the vessel, or even from the floor, the link being held against the action of the tightening-screw by such independent support.

I am aware that a filter has been connected to a faucet by a link and screw, said link being practically a fixture on the faucet, and that pressure-gages have been detachably connected with steam-boilers; and I do not broadly claim devices of this character, but only the construction hereinafter pointed out. My device is intended for use in breweries. Heretofore it has been the practice to test the pressure in beer-casks by allowing the beer to be forced out in a jet by internal pressure, which latter was roughly estimated by the force of the jet. This method is wasteful, uncertain, and untidy; but, so far as I am aware, none other is known in the art.

It is essential that my device be easily applied to and removed from the faucet without removal of the cock, so that one pressure-gage may be made to conveniently and frequently test the pressure in any desired number of beer-casks, and it is important that the connection between the gage and faucet be such that it can be quickly made without the use of tools; and, further, it is desirable that the packed seat of the gage-extension be pressed in a direct line against the mouth of the faucet, since otherwise the packing would be unequally affected by the pressure and would be liable to leak after it had become worn or deformed by continual use. My device differs from the steam-gages above referred to, which employ screw-couplings that require a tool to manipulate, and which gages are not adapted for direct application to a faucet. They also make use of a flexible or siphon pipe, either of which would be objectionable in a beer pressure-gage, which features, together with others, render said patented gages unnecessarily complex in structure and too slow of application for the purposes herein proposed.

In my device the gage-extension 4 is bent, and its outer limb or end is provided with a packed seat or socket. This provides for connecting the gage directly to the faucet without the use of unnecessary connecting-pipes or of a screw-coupling. The gage is thus seated directly upon the faucet, but is supported above it for convenience in inspecting its register, while the pressure of the screw acts centrally or in a direct line through the center of the packed seat and the axis of the faucet-mouth.

Having thus described my invention, what I desire to claim and secure by Letters Patent is—

1. The combination of a cask, a faucet for drawing off its liquid contents, a pressure-gage provided with an extension which connects immediately with the gage and supports the same, and which is also applied immediately to the mouth of the faucet, and a clamping device which clamps said extension directly to the faucet, substantially as specified.

2. The combination of a pressure-gage having an extension and a packed seat in said extension, the link provided with the screw, and the faucet having a projection to engage the link, the projection and the screw being in the axis of the link, substantially as set forth, whereby the link may be readily applied to a faucet without removing its cock, and whereby the seat of the extension may be forced in a straight line against the mouth of the faucet.

3. A pressure-gage provided with a bent extension having a seat provided with a packing on its outer limb, a faucet with downwardly-directed mouth, and the clamp and screw, whereby the seat and the mouth of the faucet may be clamped together and the gage held directly upon the faucet and above it, substantially as set forth.

In testimony whereof I affix my signature in presence of two witnesses.

MARION WARREN.

Witnesses:
  G. E. GREEN,
  BENJ. R. CATLIN.